(12) United States Patent
Riviere

(10) Patent No.: US 6,507,988 B1
(45) Date of Patent: Jan. 21, 2003

(54) AUTOMOTIVE WHEEL CAMBER ALIGNMENT APPARATUS AND METHOD OF ALIGNING AUTOMOTIVE WHEELS

(75) Inventor: David Riviere, Medina, NY (US)

(73) Assignee: Positive Marketing Inc., Buffalo, NY (US)

( * ) Notice: Subject to any disclaimer, the term of this patent is extended or adjusted under 35 U.S.C. 154(b) by 0 days.

(21) Appl. No.: 09/494,015

(22) Filed: Jan. 28, 2000

(51) Int. Cl.[7] ............................................. G01M 19/00
(52) U.S. Cl. ................. 29/407.01; 33/203.18; 33/203.19; 33/371
(58) Field of Search ............................ 29/407.01; 33/203, 33/203.18, 203.19, 203.2, 370, 371, 333

(56) References Cited

U.S. PATENT DOCUMENTS

| | | | |
|---|---|---|---|
| 2,028,622 A | * | 1/1936 | Phelps ........................ 33/1 SB |
| 2,503,580 A | * | 4/1950 | Fontaine ...................... 33/203 |
| 2,531,102 A | * | 11/1950 | Beckwith ..................... 33/336 |
| 2,831,265 A | | 4/1958 | Weaver |
| 2,958,952 A | | 11/1960 | Bender |
| 3,222,794 A | * | 12/1965 | Pereue et al. ................. 33/336 |
| 3,234,656 A | * | 2/1966 | MacMillan ................... 33/301 |
| 3,409,991 A | * | 11/1968 | Davis et al. .................. 33/335 |
| 3,423,839 A | * | 1/1969 | Liskey ......................... 33/336 |
| 3,443,318 A | * | 5/1969 | MacMillan ............... 33/203.18 |
| 3,488,023 A | * | 1/1970 | Shooter et al. ........... 248/205.1 |
| 3,837,087 A | | 9/1974 | Dennis |
| 3,956,830 A | * | 5/1976 | MacMillan ................... 33/337 |
| 4,114,283 A | | 9/1978 | Spainhour et al. |
| 4,176,463 A | * | 12/1979 | Ringle ...................... 33/203.18 |
| 4,542,592 A | * | 9/1985 | Hopkins ....................... 33/386 |
| 4,546,548 A | | 10/1985 | Bullock, Sr. |
| 4,759,133 A | | 7/1988 | Macpherson |
| 5,168,632 A | | 12/1992 | Rimlinger, Jr. |
| 5,179,784 A | | 1/1993 | Kowis |
| 5,446,967 A | * | 9/1995 | Gender ..................... 33/203.18 |
| 5,575,073 A | * | 11/1996 | Von Wedemayer .......... 33/365 |
| 5,685,210 A | * | 11/1997 | Ringle et al. ................... 83/13 |
| 6,035,729 A | * | 3/2000 | Weinmann .................. 73/865.8 |
| 6,076,269 A | * | 6/2000 | Sekino et al. ................. 33/371 |
| 6,098,296 A | * | 8/2000 | Perisho, Jr. et al. .......... 33/203 |

FOREIGN PATENT DOCUMENTS

| | | | | |
|---|---|---|---|---|
| EP | 777103 | * | 6/1997 | ............ G01B/5/24 |
| FR | 1.280.700 | | 11/1962 | |

* cited by examiner

*Primary Examiner*—Gregory M. Vidovich
*Assistant Examiner*—Essama Omgba
(74) *Attorney, Agent, or Firm*—Simpson & Simpson, PLLC

(57) ABSTRACT

A method and apparatus for use in aligning automotive wheels. The apparatus includes a body having a first end and a second end, and including an aperture at the first end arranged to receive a wheel assembly lug; an adjustable camber liquid level arranged longitudinally within the body; and, a horizontal liquid level arranged perpendicularly to the adjustable camber liquid level. The method includes the steps of measuring camber of an automotive wheel with the tool of the invention affixed to a single lug of the wheel assembly, where the tool comprises a liquid level having a horizontal liquid level and a camber liquid level, and the measuring consists of zeroing the horizontal liquid level and the camber liquid level prior to making a repair of the vehicle; removing the tool from the single lug; performing the repair of the vehicle; re-affixing the tool to the single lug; and, adjusting the camber of the wheel assembly such that the horizontal liquid level and the camber liquid level are re-zeroed.

5 Claims, 5 Drawing Sheets

AUTOMOTIVE WHEEL CAMBER ALIGNMENT APPARATUS AND METHOD OF ALIGNING AUTOMOTIVE WHEELS

FIELD OF THE INVENTION

This invention relates generally to an apparatus for use in aligning the wheels of an automobile or other vehicle, and, in particular, to a unique tool for quickly and easily setting camber to a position identical to that just prior to the repair. The invention also relates to a method for aligning automotive wheels.

BACKGROUND OF THE INVENTION

As is generally known, camber refers to the outward or inward tilt of an automobile wheel at the top, caster refers to the angle, in degrees, of the steering axis relative to a standard vertical axis, and toe represents the extent to which a leading edge of the wheel is biased inwardly (toe-in) or outwardly (toe-out) expressed in degrees, inches, or millimeters. Wheel alignment involves measuring these initial readings, comparing them to the specifications established by the vehicle's manufacturer, and then applying appropriate adjustment techniques until the actual readings correspond to the manufacturer's recommended specifications. In many vehicles it is necessary to remove the entire wheel assembly in order to perform the alignment. This is especially true with cars that require four-wheel alignment.

In a conventional alignment technique, the existing camber, caster and toe readings are determined by a conventional alignment machine. The vehicle is then raised on a jack or other lift. The wheel assembly, brake drum and/or rotor are then removed permitting access to remove the bolts that secure the spindle/hub assembly to the axles. Alignment implements, such as shims, are then inserted between the axle and spindle/hub assembly to correct camber and/or toe misalignment. The wheel assembly is then reinstalled, and measurements taken again. This procedure may be repeated several times until proper alignment is achieved.

In many vehicles, the original camber setting (prior to a repair or alignment procedure) matches manufacturer specifications. Unfortunately, loosening of a wheel strut and other vehicle repairs alters the camber setting. What is needed, then, is a simple tool that makes a relative (as opposed to quantitative) measurement of camber prior to a repair or alignment procedure, and can then be used to quickly and easily take a second relative measurement so that the camber can be reset to match the initial setting. It is not necessary that a tool of this type make actual measurements in degrees. Only relative "before" and "after" measurements are required. In other words, it is only necessary to set the camber after repair and/or alignment to equal the camber before alignment—without even knowing quantitatively what the camber setting is.

Many different methods and apparatus for wheel alignment are known in the art. U.S. Pat. No. 5,168,632 (Rimlinger, Jr.) discloses a wheel alignment method and apparatus that enables duplication of predetermined camber, caster and toe readings. The simple yet sophisticated tool of this invention makes actual camber measurements in fractions of degrees (measurements that are not always necessary). It also enables measurement of toe in inches. The patented device is arranged to be secured to all five lugs of a conventional wheel assembly.

U.S. Pat. No. 5,179,784 (Kowis) discloses a wheel alignment tool for adjusting caster, camber and toe, especially for large truck or bus wheels. The device includes a frame, a plurality of abutment members fastened to the frame and extending transversely outwardly therefrom, a bubble level fastened to the frame so as to provide an indication of the inclination of the frame relative to vertical, and an indicator device so as to provide a positive indication of the degree of inclination. The device is affixed to the wheel assembly by several wing nuts.

U.S. Pat. No. 4,114,283 (Spainhour et al.) discloses a relatively complex device for precisely measuring camber and caster quantitatively.

U.S. Pat. No. 4,546,548 (Bullock, Sr.) also discloses a device for quantitative measurement of camber and caster. This device includes an adaptor for mounting the caster-camber gauge to the wheel in a plane perpendicular to the axis of rotation of the wheel. U.S. Pat. No. 2,831,265 (Weaver) also discloses a gauge-attaching clamp for automotive wheels.

Many other methods and devices for wheel alignment are known in the art. Most of these known devices, however, are designed for quantitative, rather than relative (before and after) measurement of camber, caster and/or toe. What is needed, then, is a simple device and procedure for measuring relative camber prior to and after a vehicle repair or alignment operation.

SUMMARY OF THE INVENTION

The present invention broadly comprises a method and apparatus for use in aligning automotive wheels. The apparatus of the invention includes a body having a first end and a second end, and including an aperture at the first end arranged to receive a wheel assembly lug; an adjustable camber liquid level arranged longitudinally within the body; and, a horizontal liquid level arranged perpendicularly to the adjustable camber liquid level. The method of the invention includes the steps of measuring camber of an automotive wheel with the tool of the invention affixed to a single lug of the wheel assembly, where the tool comprises a liquid level having a horizontal liquid level and a camber liquid level, and the measuring consists of zeroing the horizontal liquid level and the camber liquid level prior to aligning the wheel assembly; removing the tool from the single lug; performing a repair or alignment of the automotive wheel assembly; re-affixing the tool to the single lug; and, adjusting the camber of the wheel assembly such that the horizontal liquid level and the camber liquid level are re-zeroed.

A general object of the invention is to provide a method and apparatus for aligning automotive wheel assemblies which does not require quantitative measurement of camber.

Another object of the invention is to provide an automotive wheel alignment tool that need only be secured to a single wheel lug during use.

A further object of the invention is to provide a simple means of measuring relative camber before and after an automotive repair or alignment procedure, such that the camber setting immediately after a repair or alignment is the same as the camber setting immediately prior to the repair or alignment.

These and other objects and advantages of the present invention can be determined from the following description of preferred embodiments according to the invention and the accompanying drawings and claims.

DETAILED DESCRIPTION OF THE PREFERRED EMBODIMENTS

At the outset, it should be appreciated that the attached drawings are intended to be a part of the written description of the invention. Identical reference numbers on different drawing figures refer to identical structural elements. The terms "top", "bottom", "right", "left", "clockwise", "counterclockwise", and their adverbial and adjectival variations refer to the perspective of one facing the particular drawing figure being described.

The subject invention comprises a method and apparatus for performing a relative, qualitative measure of camber as part of a repair, wheel or steering alignment. Unlike other methods which make precise, quantitative measurements, the subject invention is intended to measure a relative camber setting before a repair or alignment is performed, and then making a subsequent measurement and setting the camber to the setting just prior to the repair or alignment operation. The actual camber angle in degrees is not measured by the method and apparatus of the invention. Rather, the method and apparatus takes a relative camber reading before a repair or alignment, and then alignment techniques are used to obtain the same reading afterwards. Unlike other devices that require elaborate mounting brackets or mounting on an entire wheel assembly, the present invention mounts very simply to a single wheel lug.

The tool and method of the invention may be used in a variety of circumstances. Quite often, repairs are made to vehicles that affect alignment. These include replacement and/or adjustment of struts, idler arms, tie rod ends, brake assemblies, steering linkage, wheel bearings, etc. Presently, performing these repairs necessitates the performance of a complete quantitative and qualitative wheel alignment. With respect to camber, for example, mechanics frequently perform actual quantitative measurements and alignments when making some repairs. These alignments are sometimes unnecessary, however, as in those cases where the vehicle is in perfect alignment before the repair, it is necessary only to reset the camber after the repair to its original setting (without even knowing quantitatively what the setting was or is). In addition to measuring relative camber before and after a repair, the present invention may also be used to measure relative camber before and after other alignment techniques are applies (such as alignment of caster and toe).

Structure

Figure 1:
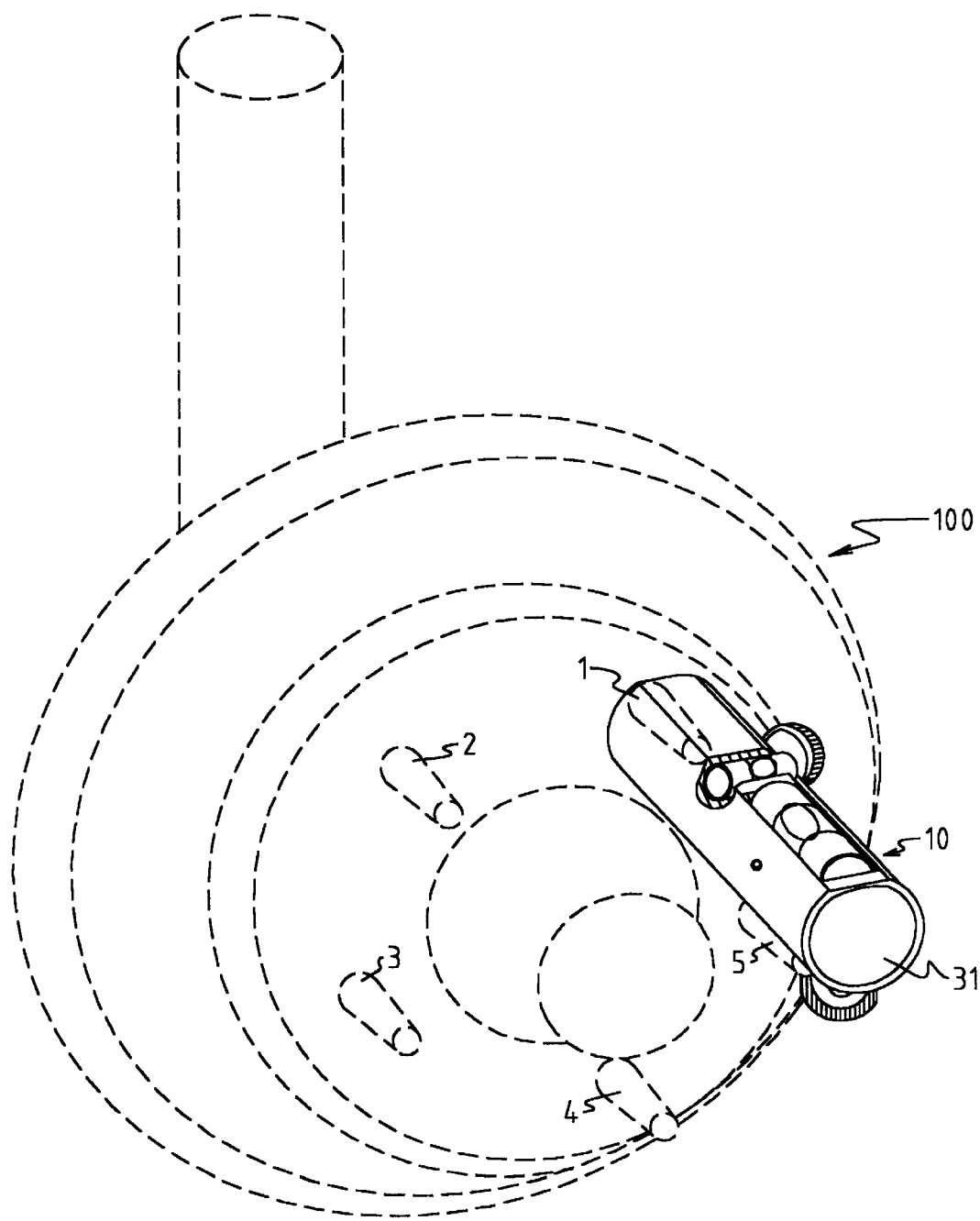
FIG. 1 is a perspective view of the tool of the invention shown installed on an automotive wheel lug during operation.

Adverting now to the drawings, FIG. 1 illustrates alignment tool 10 in perspective view fixedly secured to lug 1 of wheel assembly 100. A wheel, not shown, was removed from the wheel assembly prior to securing tool 10 to lug 1. As seen in the drawing, wheel assembly 100 includes five wheel lugs, or studs, 1, 2, 3, 4 and 5, respectively. As is well known, a wheel is secured to the lugs with lug nuts. To align the wheel and steering of a vehicle, the wheel is typically removed to permit access to brakes, struts, idler arms, tie rods, and other wheel and steering related components. While device 10 is shown fixedly secured to lug 1, it should be appreciated that the device could be secured to any one of the lugs. In operation, the device is secured to the same lug both before and after alignment techniques have been applied.

Figure 2:
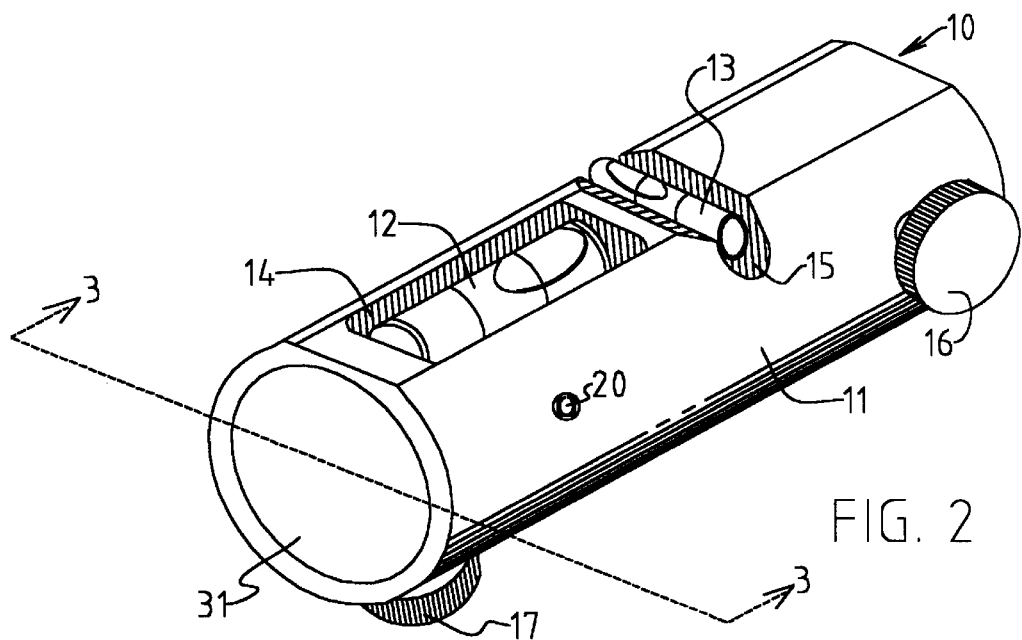
FIG. 2 is a perspective view of the tool of the invention.

Device 10 is shown in more detail in perspective view in FIG. 2. The device is shown to include body 11 which, in a preferred embodiment, is generally cylindrical in shape, although other shapes are certainly possible. The device includes two setscrews. Setscrew 16 is used to secure the device to a wheel lug. Setscrew 17 is used to raise and lower camber liquid level 12, as will be described infra. The device also includes two liquid levels; horizontal level 13 fixedly secured within rounded groove 15, and camber liquid level 12 fixedly secured within groove 14 of pivoting cradle 21 (shown in more detail in FIG. 7. Cradle 14 is arranged to pivot about pivot pin 20.

Figure 3:
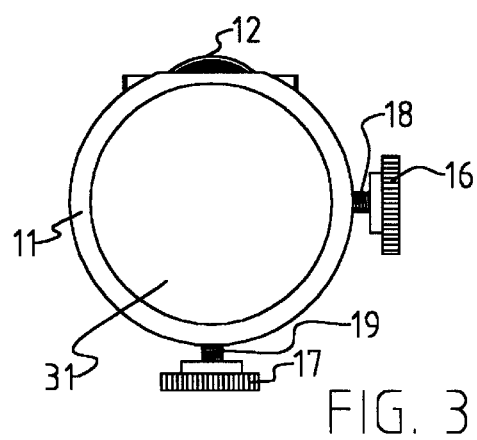
FIG. 3 is an end view taken generally along line 3—3 in FIG. 2.
Figure 4:
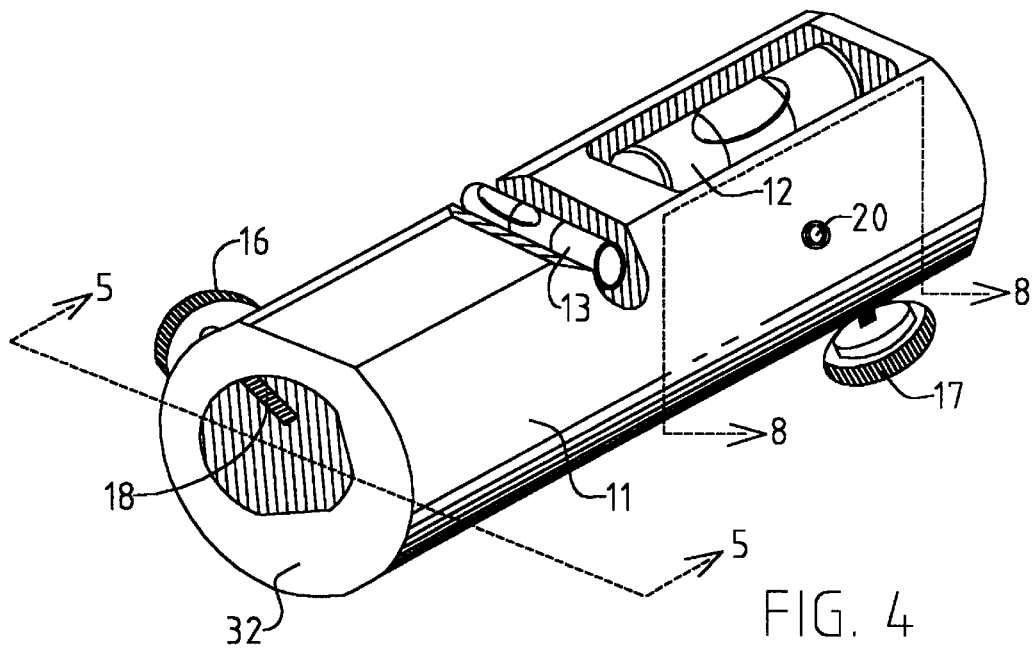
FIG. 4 is a perspective view of the tool of the invention shown in FIG. 1, but rotated 180° with respect to the view of FIG. 1.

An end view of device 10 is shown in FIG. 3. This view is taken generally along line 3—3 in FIG. 2. Body 11 is seen to include round end cap 11. This view also shows that setscrew 17 comprises threaded screw 19, and setscrew 16 comprises threaded screw 18. FIG. 4 is a view of the device shown in FIG. 2, but rotated 180° to show end surface 32 which includes aperture 35. Aperture 35 is arranged to receive a wheel lug. Set screw 16, when rotated in a clockwise rotation, causes threaded portion 18 to clamp the lug. As seen in both FIGS. 2 and 4, camber liquid level 12 is arranged longitudinally within body 11, and horizontal liquid level 13 is arranged transversely thereto. In a preferred embodiment, levels 12 and 13 are arranged perpendicularly to one another.

Figure 5:
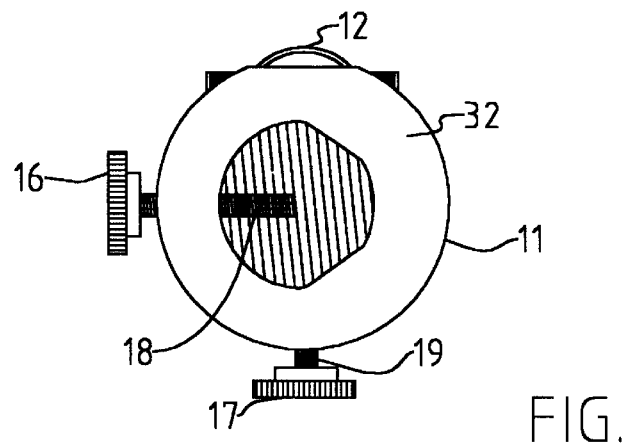
FIG. 5 is an end view of the tool, taken generally along line 5—5 in FIG. 4.
Figure 6:
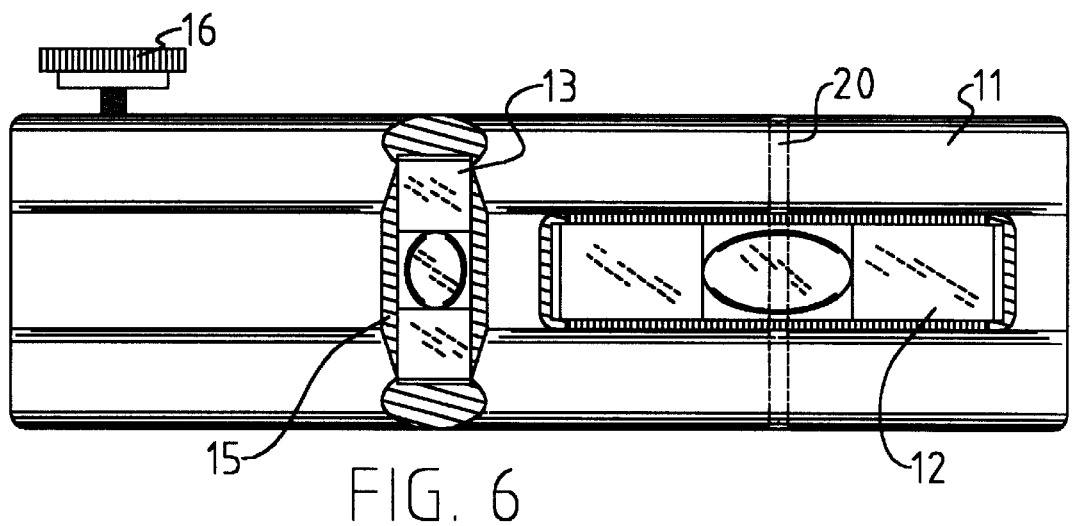
FIG. 6 is a plan view of the tool shown in FIG. 4.

FIG. 5 is an end view of device 10 taken generally along line 5—5 in FIG. 4, and clearly shows end surface 32 and aperture 35, as well as threaded portion 18 of setscrew 16 protruding into aperture 35. It should be noted that the shape of aperture 35 is designed to wedge and hold the device in a clamped position about a wheel lug when setscrew 16 is tightened. However, the shape of the aperture is not critical, as other interior shapes of the aperture would also function suitably. FIG. 6 is a plan view of device 10, which clearly shows the relative positions of the two liquid levels. Pivot pin 20 is also shown in phantom is this view.

Figure 7:
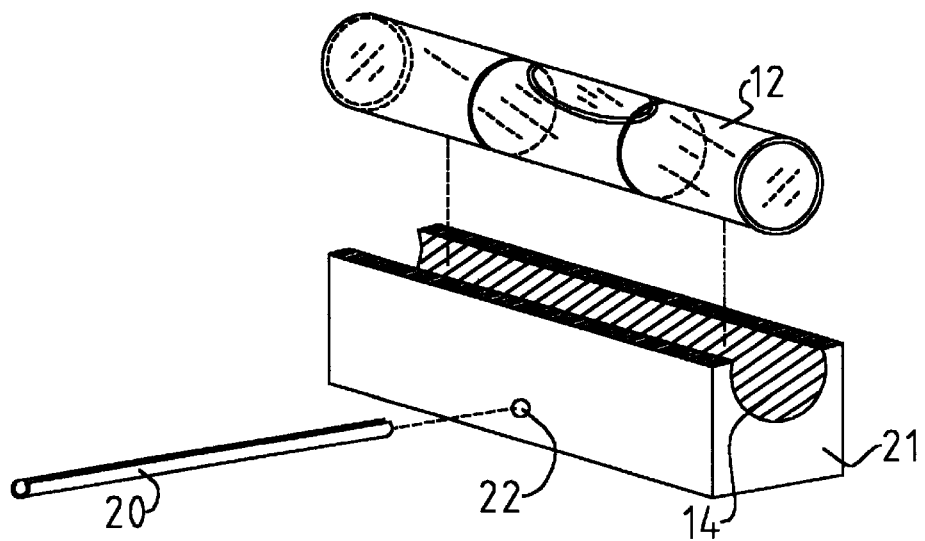
FIG. 7 is an exploded view of the camber level assembly of the tool.

Camber liquid level 12 is secured within rounded groove 14 of cradle 21 as shown in exploded view in FIG. 7. Cradle 21 includes a through bore 22, through which pivot pin 20 passes as shown in FIG. 7. The inner diameter of the through bore is larger than the outer diameter of the pivot pin to enable the cradle to pivot about the pin.

Figure 8:
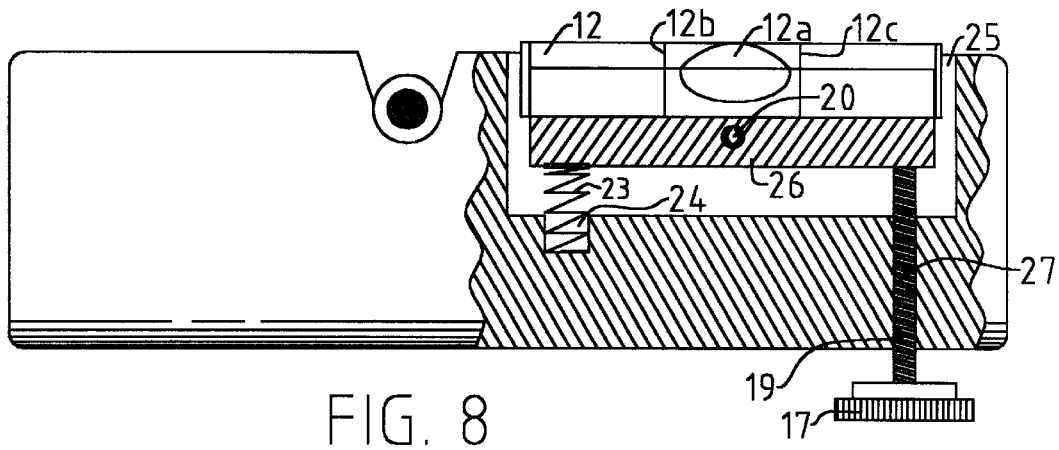
FIG. 8 is a side elevation in partial cross-sectional view, taken generally along line 8—8 in FIG. 4.

FIG. 8 is a side elevational view in partial cross-section, taken generally along line 8—8 in FIG. 4. Pivot pin 20 is fixedly secured within through-bores in body 11, one of which is shown in FIG. 4, and the other of which is shown in FIG. 2. As shown in cross-section in FIG. 8, spring 23 is disposed within partial through bore 24 internal to body 11. The spring is arranged to bias a first end of cradle 21. The spring urges clockwise rotation of the cradle about pivot pin 20. In FIG. 8, setscrew 17 has been adjusted such that threaded portion 27 is in contact with a second end of cradle 21. The setscrew biases the cradle and urges rotation (as the set screw is tightened by turning in a clockwise rotation) of the cradle in a counterclockwise rotation, against the bias of the spring. In FIG. 8, the setscrew has been positioned to cause camber level 12 to show a zero reading. In other words, bubble 12a is positioned between gradient lines 12b and 12c of level 12.

Figure 9:
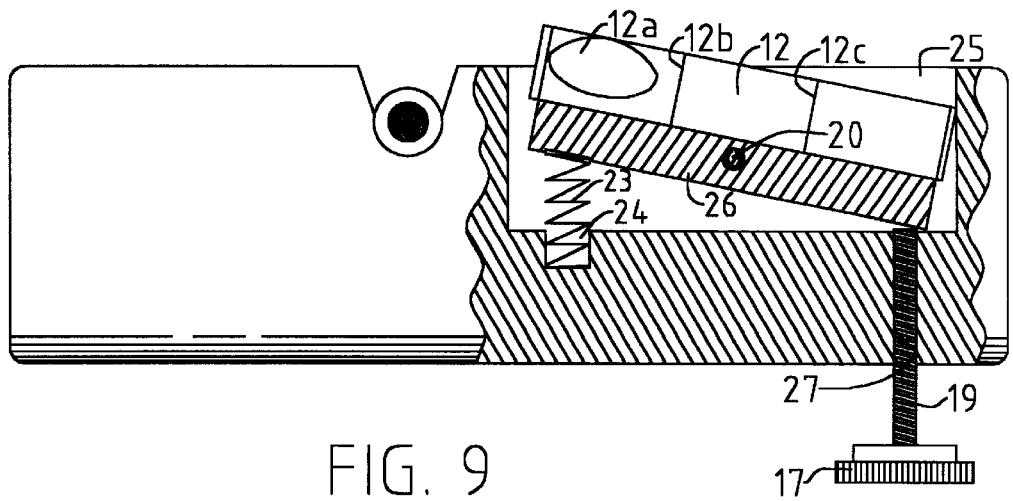
FIG. 9 is a view similar to that of FIG. 9, but with camber level 12 elevated at its left end; and, FIG. 10 is a view similar to that of FIG. 10, but with camber level 12 elevated at its right end.
Figure 10:
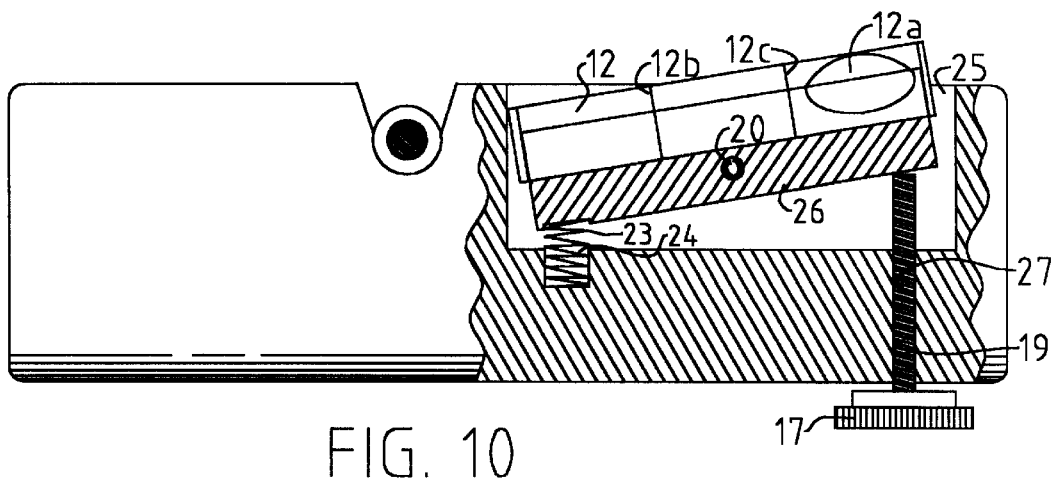

FIG. 9 is a view similar to that of FIG. 8, but, in this view, set screw 17 has been loosened (rotated counterclockwise) such that the first end of the cradle is higher than the second, allowing the spring to cause the cradle to slope downwardly from left to right. FIG. 10, on the other hand, illustrates the set screw being tightened (by rotating in a clockwise rotation) so as to raise the second end of the cradle above the first end, compressing spring 23, and causing the cradle to slope downwardly from right to left.

Operation

To perform a wheel alignment using the tool of the invention, in a preferred embodiment, one would perform the following steps:

1. Depress and hold brake pedal of vehicle with a suitable tool. Lock the steering wheel with wheels in straight ahead position.
2. With vehicle properly jacked, remove wheel.
3. Slide device 10 over one wheel lug. Level (zero) horizontal level 13 and finger tighten setscrew 16.
4. Bring camber level 12 to exact zero setting using setscrew 17.
5. Loosen tool from wheel lug and set aside, placing tool on end on flat surface, with end cap 31 contacting flat surface. (Optional)
6. Perform repair of vehicle.
7. Place device 10 on same wheel lug, move spindle in or out to bring camber level 12 to exact zero setting. Hold rotor at that reading and tighten strut bolts.
8. Remove device 10, replace wheel and properly torque.

Thus, it is seen that the simple device 10 permits a very simple method of setting camber to the exact same setting after a repair as before the repair. Yet the tool does not require an exact quantitative measurement of camber (e.g., in degrees). All a mechanic need do is zero the device's camber level both before and after performing the repair.

It should be clear that the objects of the invention are efficiently obtained. Although my invention is described by reference to specific preferred embodiments, it is clear that variations can be made or other material used without departing from the spirit and scope of the invention as claimed.

What we claim is:

1. A method of aligning an automotive wheel assembly of a vehicle, comprising:

measuring camber of said automotive wheel assembly with a tool affixed to a single lug of said wheel assembly, where said tool comprises a liquid level having a horizontal liquid level and a camber liquid level, and said measuring consists of zeroing said horizontal liquid level and said camber liquid level prior to a repair of said vehicle;

removing said tool from said single lug;

performing said repair of said vehicle;

re-affixing said tool to said single lug; and, adjusting the camber of said wheel assembly such that said horizontal liquid level and said camber liquid level are re-zeroed.

2. The method of aligning an automotive wheel as recited in claim 1 wherein said step of performing said repair comprises adjusting caster of said wheel.

3. The method of aligning an automotive wheel as recited in claim 1 wherein said step of performing said repair comprises adjusting toe of said wheel.

4. The method of aligning an automotive wheel as recited in claim 1 wherein said step of adjusting the camber of said wheel such that said liquid level is re-zeroed functions to return said camber to its setting just prior to said step of performing said repair of said vehicle.

5. A tool for aligning an automotive wheel, comprising:

a body having a first end and a second end, and including a single aperture at said first end arranged to receive a single wheel assembly lug;

an adjustable camber liquid level arranged longitudinally within said body, said camber liquid level is secured to a cradle pivotally mounted within said body;

a horizontal liquid level arranged perpendicularly to said adjustable camber liquid level;

a compression spring arranged to bias a first end of said cradle in a first direction of rotation; and, a second setscrew arranged to bias a second end of said cradle in opposition to said compression spring.

* * * * *